(12) United States Patent
Mellot et al.

(10) Patent No.: US 8,208,036 B2
(45) Date of Patent: Jun. 26, 2012

(54) PROCESSING FOR CAPTURED IMAGES

(75) Inventors: Pascal Mellot, Lans en Vercors (FR); Arnaud Laflaquiere, Merchiston-Edinburgh (GB)

(73) Assignees: STMicroelectronics (Grenoble2) SAS, Grenoble (FR); STMciroelectronics R&D Limited, Marlow (GB)

( * ) Notice: Subject to any disclaimer, the term of this patent is extended or adjusted under 35 U.S.C. 154(b) by 246 days.

(21) Appl. No.: 12/560,620

(22) Filed: Sep. 16, 2009

(65) Prior Publication Data

US 2010/0245627 A1 Sep. 30, 2010

(30) Foreign Application Priority Data

Sep. 16, 2008 (FR) ...................................... 08 56234

(51) Int. Cl.
*H04N 5/228* (2006.01)
*H04N 5/76* (2006.01)
*H04N 9/07* (2006.01)
(52) U.S. Cl. .................. 348/222.1; 348/231.99; 348/267
(58) Field of Classification Search .................. None
See application file for complete search history.

(56) References Cited

U.S. PATENT DOCUMENTS

| 6,791,615 | B1 * | 9/2004 | Shiomi et al. | 348/323 |
| 6,870,565 | B1 | 3/2005 | Blerkom et al. | |
| 7,015,966 | B1 * | 3/2006 | Lin | 348/324 |
| 7,027,665 | B1 | 4/2006 | Kagle et al. | |
| 7,295,238 | B2 * | 11/2007 | Tanaka et al. | 348/316 |
| 7,907,190 | B2 * | 3/2011 | Kosover et al. | 348/241 |
| 2002/0149674 | A1 * | 10/2002 | Mathews et al. | 348/144 |
| 2003/0090577 | A1 * | 5/2003 | Shirakawa | 348/222.1 |
| 2004/0008905 | A1 * | 1/2004 | Marche | 382/284 |
| 2004/0090538 | A1 * | 5/2004 | Kadohara | 348/230.1 |
| 2004/0189819 | A1 | 9/2004 | Saito | |
| 2007/0076109 | A1 | 4/2007 | Krymski | |

FOREIGN PATENT DOCUMENTS

EP 1037458 9/2000

OTHER PUBLICATIONS

Lee C et al. "Parallel image processing applications on a network of workstations", Parallel Computing, Elsevier Publishers, Amsterdam, NL. vol. 21, No. 1, Jan. 1, 1995, pp. 137-160, XP004014101 ISSN: 0167-8191.
International Search Report, Apr. 20, 2009, PCT Application No. FR0856234.

* cited by examiner

*Primary Examiner* — Albert Cutler
(74) *Attorney, Agent, or Firm* — Lisa K. Jorgenson; Stephen Bongini; Fleit Gibbons Gutman Bongini & Bianco P.L.

(57) ABSTRACT

A method is provided for reading a captured image, with the captured image comprising at least first and second parts and a border area positioned between the first and second parts. Converted pixels are obtained by applying digital-to-analog conversion to the pixels in the captured image, and the converted pixels corresponding to the border area of the captured image are stored in a buffer. A first set of processed pixels is obtained by applying image processing to the converted pixels corresponding to the first part of the image and to the converted pixels stored in the buffer, and a second set of processed pixels is obtained by applying image processing to the converted pixels corresponding to the second part of the image and to the converted pixels stored in the buffer. A processed image is provided by combining the first and second sets of processed pixels. Also provided is a processing device for reading a captured image.

22 Claims, 2 Drawing Sheets

PROCESSING FOR CAPTURED IMAGES

CROSS-REFERENCE TO RELATED APPLICATIONS

This application is based upon and claims priority from French Patent Application No. 08 56234, filed Sep. 16, 2008, the entire disclosure of which is herein incorporated by reference.

FIELD OF THE INVENTION

The present invention relates to readout circuits, and more particularly to readout circuits for image sensors or devices for receiving video content.

BACKGROUND OF THE INVENTION

An image sensor, such as a camera, captures images. The captured images are processed by a readout circuit in order to be displayed on a screen for viewing. For video applications in particular, it is desirable to use a high performance readout circuit that provides fast image processing. The larger the number of images to be processed, the faster the processing speed of the readout circuit needs to be.

Such a readout circuit comprises electronic components which impose limitations on the processing speed. This limits the general processing speed of the readout circuit.

U.S. Patent Application Publication No. 2007/0076109 discloses a readout circuit architecture which increases the processing speed for images captured by the readout circuit in spite of the limitations imposed by certain electronic components of the circuit. This architecture is based on duplicating a processing chain in the readout circuit in order to double the processing speed for captured images.

In this manner, the processing speed of such a readout circuit is increased in spite of the processing speed limitations of its electronic components.

With such an architecture, the captured image is independently processed in two parts. Then the two independently processed parts of the image are combined when reassembling the captured image for display, yielding a processed image corresponding to the entire captured image. This processed image can then be displayed. As a result, however, the displayed image may have edge artifacts between the two parts of the image that were processed independently.

Such edge artifacts can visibly degrade the quality of displayed images. When a readout circuit having an architecture such as the one described in U.S. Patent Application Publication No. 2007/0076109 is used, the processing provided is well-suited for images captured at high resolutions, but there is degradation of the displayed images when the two independently processed parts of the images are combined.

SUMMARY OF THE INVENTION

It is an object of the present invention to provide an improved readout circuit.

One embodiment of the present invention provides a method for processing a captured image that is in the form of a set of pixels, with the captured image comprising at least first and second parts of the image, and a border area positioned between the first and second parts of the image. According to the method, converted pixels are obtained by applying a digital-to-analog conversion to the pixels in the captured image, and the converted pixels are stored in a buffer corresponding to the border area of the captured image. A first set of processed pixels is obtained by applying image processing to the converted pixels corresponding to the first part of the image as well as to the converted pixels stored in the buffer, and a second set of processed pixels is obtained by applying image processing to the converted pixels corresponding to the second part of the image as well as to the converted pixels stored in the buffer. A processed image for display is provided by combining the first and second sets of processed pixels.

Another embodiment of the present invention provides a processing device that includes a conversion unit adapted to obtain converted pixels by applying a digital-to-analog conversion to the pixels in the captured image, a buffer adapted to store the converted pixels corresponding to the border area of the captured image, a first processing chain adapted to obtain a first set of processed pixels by applying image processing to the converted pixels corresponding to the first part of the image as well as to the converted pixels stored in the buffer, a second processing chain adapted to obtain a second set of processed pixels by applying image processing to the converted pixels corresponding to the second part of the image as well as to the converted pixels stored in the buffer, and a combining unit adapted to provide a processed image for display, by combining the first and second sets of processed pixels.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
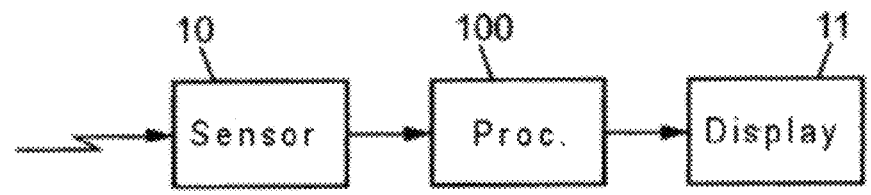
FIG. 1 shows an image processing system according to one embodiment of the present invention.

Preferred embodiments of the present invention will be described in detail hereinbelow with reference to the attached drawings.

Preferred embodiments of the present invention provide a method for processing a captured image read in the form of a set of pixels, with the captured image including at least a first and a second part of the image, and a border area positioned between the first and second parts of the image. According to one method, converted pixels are obtained by applying a digital-to-analog conversion to the pixels in the captured image, and the converted pixels are stored in a buffer corresponding to the border area of the captured image. A first set of processed pixels is obtained by applying image processing to the converted pixels corresponding to the first part of the image as well as to the converted pixels stored in the buffer, and a second set of processed pixels is obtained by applying the image processing to the converted pixels corresponding to the second part of the image as well as to the converted pixels stored in the buffer. A processed image is provided for display by combining the first and second sets of processed pixels.

This process not only increases the general speed of the processing due to several parts of the captured image being processed in parallel, but also reduces the edge artifacts at the separation between the different parts of the image that are processed in parallel. In particular, a processing chain in a readout circuit performs certain operations intended to correct the digital values associated with certain pixels, based on the digital values of the pixels neighboring the pixel to be corrected. When the captured image is processed as a whole, the pixels located at its center are correctly processed by examining the neighboring pixels. However, when the captured image is separated into multiple parts for independent processing, this is no longer the case for the pixels located at the edges of the separation or separations between the various parts.

In embodiments of the present invention, each processing chain is supplied not only the pixels of one part but also the pixels of the border area, so that two processing chains which are in charge of processing two neighboring parts of the image receive some of the same pixels of the image being processed. This redundancy in the pixels sent to the two processing chains avoids degradation of the displayed image related to processing at the border between two parts of the image that are processed in parallel.

In contrast, in the conventional device described above, the captured image is processed in two separate parts and the two processing chains are supplied these two separate parts in parallel without any redundancy in the pixels supplied to the two processing chains. At the bordering edge of each of these separate parts, it is not possible to correctly apply the operations in the processing chain which require the use of neighboring pixels.

In embodiments of the present invention, redundant pixels from the border between the two parts to be processed in parallel are sent. The operations of the processing chain which require the inclusion of pixels neighboring the pixel currently being processed can thus be advantageously implemented in an optimum manner for the border area.

In addition, the inclusion of a border area between two parts of the image allows the process of one embodiment of the present invention to advantageously be implemented in a simple manner, as no pixel is copied multiple times but pixel redundancy is provided to both processing chains simultaneously.

The present invention is not limited to a certain number of image parts to be taken into consideration. The number of image parts in any embodiment is directly related to the number of processing chains provided in the architecture of the specific processing device being used.

To implement this process, a border area is defined between two consecutive parts of an image. In one embodiment of the present invention, a buffer comprises first and second buffers, the border area is composed of first and second areas, and in the storing step the first area is stored in the first buffer and the second area is stored in the second buffer.

In this manner, in the exemplary case where the architecture used has two processing chains it is advantageously possible to provide each of the processing chains with half the captured image in addition to the bordering pixels of the other half. This allows a high performance implementation of the operations in the processing chain that require the inclusion of neighboring pixels.

The pixels of the image can be considered as columns of pixels and therefore it can be considered that the captured image comprises a plurality of columns of pixels.

In this case, in one embodiment the step of obtaining converted pixels includes simultaneously reading from their respective SRAMs the column of pixels located at the side of the first part of the image furthest from the border area and the column of pixels located at the side of the second part of the image furthest from the border area, simultaneously reading from their respective SRAMs the column adjacent to the last column of pixels stored from the first part of the image and the column of pixels adjacent to the last column of pixels stored from the second part of the image, and repeating this until the column of pixels in the first part of the image adjacent to the border area and until the column of pixels in the second part of the image adjacent to the border area are reached.

Additionally, the storing step includes simultaneously reading from their respective SRAMs and storing in their respective first and second buffers the column of pixels located at the first side of the border area adjacent to the first part of the image and the column of pixels located at the second side of the border area adjacent to the second part of the image, simultaneously reading from their respective SRAMs and storing in their respective first and second buffers the columns respectively adjacent to the last columns of pixels stored from the border area by respectively reading from the border area in two opposite directions starting from the first and second sides, and repeating this until the border area has been completely read.

Not only are these steps easy to implement in this manner, but this implementation also allows a simple implementation of the step of obtaining the first and second sets of pixels.

The image processing applied may comprise the application of at least one filter, and the size of the border area is then determined as a function of the filter.

The size of the border area, meaning the number of redundant pixels to be provided simultaneously to both processing chains, is then advantageously determined as a function of the type of filter used in these processing chains. The present invention is not limited to any type of filter.

In one embodiment of the present invention, the captured image comprises a border area between each pair of consecutive parts of the image.

Another embodiment of the present invention provides a processing device that includes a conversion unit adapted to obtain converted pixels by applying a digital-to-analog conversion to the pixels in the captured image, a buffer adapted to store the converted pixels corresponding to the border area of the captured image, a first processing chain adapted to obtain a first set of processed pixels by applying image processing to the converted pixels corresponding to the first part of the image as well as to the converted pixels stored in the buffer, a second processing chain adapted to obtain a second set of processed pixels by applying the image processing to the converted pixels corresponding to the second part of the image as well as to the converted pixels stored in the buffer, and a combining unit adapted to provide a processed image for display, by combining the first and second sets of processed pixels.

In one embodiment, the buffer comprises a first and a second buffer, and the border area is composed of a first and a second area. The first area is stored in the first buffer and the second area is stored in the second buffer.

With the captured image comprising a plurality of columns of pixels stored in their respective SRAMs, the processing device of one embodiment additionally includes a unit for reading the respective SRAMs that is adapted to read: simultaneously the column of pixels located at the side of the first part of the image furthest from the border area and the column of pixels located at the side of the second part of the image furthest from the border area, then simultaneously the column adjacent to the last column of pixels stored from the first part of the image and the column adjacent to the last column of pixels stored from the second part, in succession, until the column of pixels from the first part of the image adjacent to the border area and the column of pixels from the second part of the image adjacent to the border area are reached. It is adapted to then read and store in respective first and second respective buffers: simultaneously, the column of pixels located at a first side of the border area adjacent to the first part of the image and the column of pixels located at a second side of the border area adjacent to the second part of the image, then simultaneously, the columns of pixels respectively adjacent to the last columns of pixels stored from the border area by successively reading from the border area in two opposite directions, until the border area has been completely read.

A further embodiment of the present invention provides an image processing system having such a processing device and a display for displaying the images processed by the processing device.

Yet another embodiment of the present invention provides a computer program which can be loaded into the Memory of a computer system and that includes code for executing steps of the process described above.

Another embodiment of the present invention provides a mobile telephone comprising an image sensor and the processing device described above.

Exemplary embodiments of the present invention will now be described in detail with reference to FIGS. 1-3.

FIG. 1 shows an image processing system according to one embodiment of the present invention. The image processing system comprises an image sensor 10 adapted to capture an image as a set of pixels, and a processing device 100, which has the architecture detailed in FIG. 2 in one embodiment of the present invention. The image processing system also comprises a readout circuit 11 adapted to receive the captured and processed image or images in order to display them on a screen for viewing.

The present invention will now be described as it applies to an exemplary processing device architecture which is based on duplication of the processing chain. Due to this fact, the captured image is considered in the form of a first and second part of the image as well as a border area between the first and second parts of the image. It is easy to deduce from the following description further embodiments of the present invention that utilize a different processing device architecture having a larger number of duplicate processing chains, and therefore a larger number of image parts to be considered in a captured image, with a border area between two consecutive parts of the image.

Figure 2:
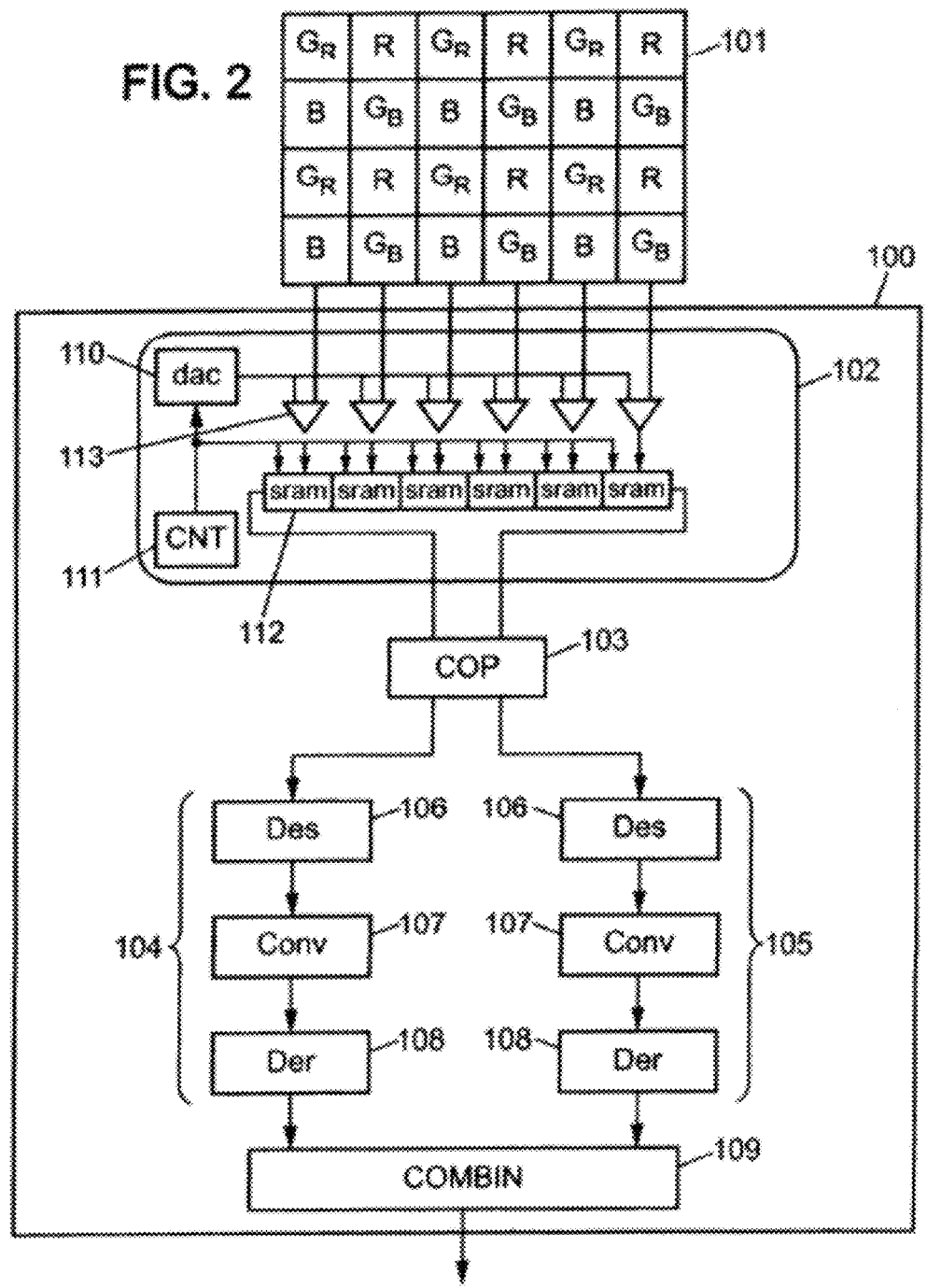
FIG. 2 shows an architecture for a processing device according to one embodiment of the present invention.

FIG. 2 shows an architecture for a processing device according to one embodiment of the present invention. The image processing device is adapted to receive columns of pixels from a captured image 101. This processing device 100 comprises a conversion unit 102 which is adapted to perform a digital-to-analog conversion of pixel columns in the captured image 101. For this purpose, the conversion unit comprises a digital-to-analog converter (DAC) 110, a counter 111, and multiple comparators 113 at the outputs of which are arranged a corresponding set of static random access memories (SRAMs) 112.

At the SRAM output, a COP module (for 'Copy') 103 comprises a buffer for storing the converted pixels corresponding to the border area, in preparation for supplying them in parallel to two processing chains.

The processing device 100 additionally comprises at least a first processing chain 104 and a second processing chain 105 that are adapted to perform the same operations on the converted pixels in preparation for reading the captured image being processed.

In this exemplary embodiment, the operations of the processing chain comprise a descrambler unit (Des) 106, a resolution conversion, unit or scaler (Cony) 107, and a derating unit (Der) 108.

It is thus arranged to apply a filtering step, such as a low-pass filter, to the pixels sent through the processing chain 104 or 105. Such a step is based on the pixels neighboring each filtered pixel. More specifically, the filtering is generally arranged to consider a plurality of pixels around the pixel being filtered.

This filtering step can advantageously be implemented in an efficient manner based on the pixels sent through the different processing chains according to this embodiment of the present invention.

It is advantageously arranged to consider the captured image in three parts in the processing device: a first and a second part of the image, with a border area in between. Thus, one is easily able to send through the first processing chain both the first part of the image and the border area, and through the second processing chain both the second part of the image and the border area. The filtering step can thus be advantageously applied to a part of the image and to the border area.

Under these conditions, edge artifacts related to the filtering step may appear at the edges between the first part of the image and the border area, and between the border area and the second part of the image. But the border between the first part of the image and the border area, which corresponds to an edge likely to undergo degradation in the second processing chain, does not correspond to an edge in the first chain, and vice versa.

As a result, at the output of the two processing chains 104 and 105, there is an advantageous processing redundancy for certain parts of the image. It is then arranged to combine the output pixels from the two processing chains by saving the pixels corresponding to the parts of the image which were not degraded and ignoring the parts of the image which may have been degraded by edge artifacts.

A combining unit 109 is adapted to receive all the pixels processed in parallel in the two processing chains 104 and 105 and to combine them so as to retain only the pixels in the portions which are not susceptible to degradation. This relies on the redundancy of the pixels sent through the two processing chains at the same time.

Figure 3:
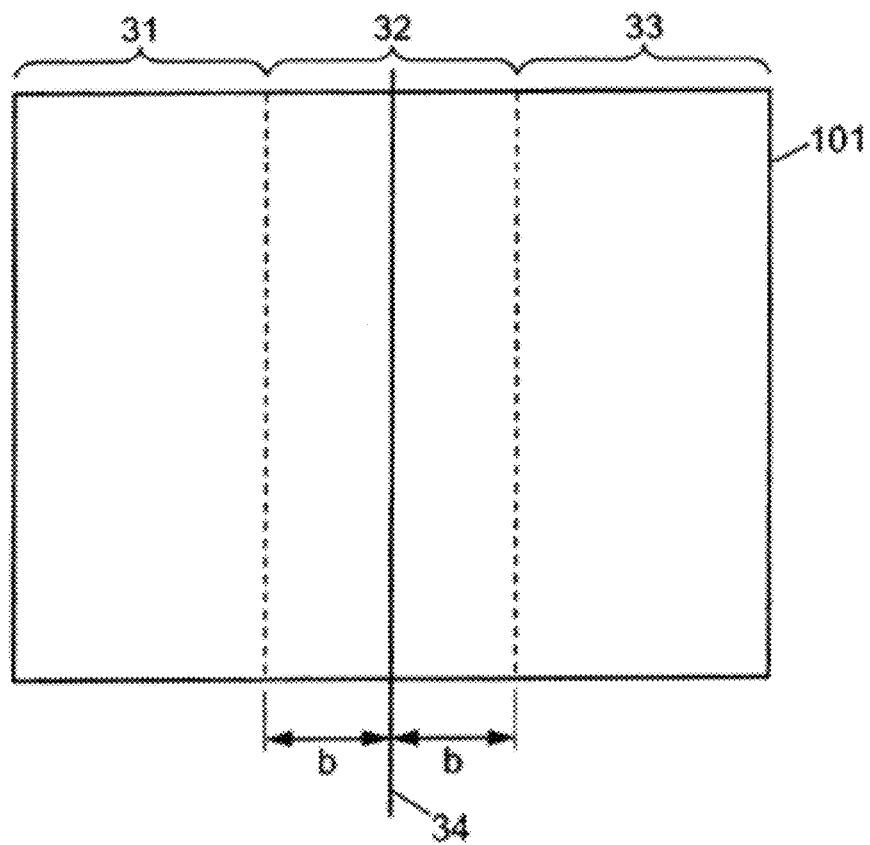
FIG. 3 shows the different parts of a captured image in accordance with image processing according to one embodiment of the present invention.

FIG. 3 illustrates a captured image considered in several parts in accordance with image processing according to one embodiment of the present invention. The captured image 101, in this exemplary embodiment of the present invention that utilizes duplication of the processing chain, comprises a first and a second part of the image 31 and 33, and a border area 32. The center of the captured image is indicated by the solid line 34. The border area 32 has a width of 2b columns of pixels, with b being any whole number for which the value can advantageously be determined as a function of the filter used in the processing chains. In this embodiment, the center of the border area and the center of the captured image coincide.

In an initial step, the pixels of all columns are stored in corresponding SRAMs.

At a time T(0), a first column of pixels located at the extreme left of the first part of the image 31 is read from its corresponding SRAM 112, and a first column of pixels of the second part of the image 33 located at the extreme right is also read from its corresponding SRAM.

Then at a time T(1), a second column of pixels from the first part of the image 31, adjacent to the first column of pixels from this same part of the image and located to the right of the first column of pixels, is read from its corresponding SRAM, and a second column of pixels from the second part of the image 33, adjacent to the first column of pixels from this same part of the image, is in turn read from its corresponding SRAM.

The process proceeds in succession in this manner until the column of pixels from the first part of the image 31 adjacent to the border area 32 is reached as well as the column of pixels from the second part of the image 33 adjacent to the border area 32 on the other side.

Similarly, the columns of pixels from the border area are then stored, not in the SRAM, but in corresponding FIFO buffers (First In-First Out) in the COP module 103.

Thus at time T(i), the first left column and the first right column of the border area 32 are stored in the FIFOs.

Then at time T(i+1), the column of pixels located to the right of the first left column and the column of pixels located to the left of the first right column are stored in the left and right FIFOs.

The process proceeds in succession in this manner for all columns of pixels in the border area 32 until all of the border area has been completely processed, meaning until the columns of pixels side by side in the center of this border area 32 are reached.

The following sections describe a detailed example of this implementation for the purposes of illustration.

The captured image 101 considered in this example comprises 3280 columns of pixels, numbered 0 to 3279. The image is divided into three parts: a left part comprising the 1640-b left columns located to the left in the captured image, a right part comprising the 1640-b columns of pixels located to the right in the captured image, and a border area comprising the 2b columns in the center of the image and located between the right part and the left part.

At time T(0), columns 0 and 3279 are read from the respective SRAMs 112. Then at time T(i), where i is between 1 and 1640-b, columns i and 3279-i are in turn read in succession from these SRAMs.

Next, from time T(1640-b) until time T(1639), the columns of pixels are read and stored in the FIFOs of the COP module 103, with a right FIFO storing the columns of pixels from the border area located to the right of the line 34 (from right to left), and a left FIFO storing the columns of pixels from the border area located to the left of the line 34 (from left to right). Thus at time T(1640-b), the column of pixels 1640-b is stored in the left FIFO and the column of pixels 1640+b is stored in the right FIFO.

Then all columns of pixels in the border area 32 are successively stored in the respective FIFOs in this manner until time T(1639), at which time the last columns of pixels to be stored 1639 and 1640 are stored in the left and right FIFOs, respectively.

The width 2b of the border area can advantageously be determined as a function of the type of filtering, for example a low-pass filter, which is being applied.

In particular, if a conventional defect correction is to be applied, it is recommended to consider blocks of pixels of 5 by 5. In such a case, b can advantageously be chosen to be equal to 2.

Advantageously there is a redundancy in certain portions of the captured image output from the two processing chains. In fact, the set of pixels provided to the first processing chain corresponds to the first part of the image 31 and the border area 32, and the set of pixels provided to the second processing chain corresponds to the second part of the image 33 and the border area 32. Edge artifacts which could degrade the quality of the displayed image are therefore likely to appear in the right side of the border area in the output of the first processing chain and in the left side of the border area in the output of the second processing chain.

Because of the arrangement described above and in particular because of the redundancy in certain portions of the outputs of the processing chains, it is advantageously possible at the combining unit to include the portions which are not likely to have degradations while ignoring those portions which are likely to have them. Thus, the pixels output from the first processing chain and corresponding to a portion of the captured image bordering the right side of the border area 32 are ignored in the combining step, because advantageously it is the pixels output from the second processing chain and which correspond to this same portion of the captured image which are considered in order to provide the processed image for display at the output of the combining unit 109.

The same is true for the pixels output from the second processing chain. The pixels output from the second processing chain and corresponding to a portion of the captured image bordering the left side of the border area 32 are ignored in the combining step, because advantageously it is the pixels output from the first processing chain and which correspond to this same portion of the captured image which are considered in order to provide the processed image for display at the output of the combining unit 109.

Thus, the pixels considered in the combining unit were processed correctly.

In addition to this combining of processing chain outputs which provides a displayed image without degradation, in one embodiment in the combining unit 109 the columns of pixels in the buffer from the right part of the border area are advantageously reordered in the reverse order from how they were stored, in order to be able to combine the information stored in the buffer related to the left part with the information stored in the buffer related to the right part.

Ultimately an image is obtained which was completely processed at least twice as fast while using the same electronic components. In addition, no edge artifacts related to this parallel processing of at least two parts of the image are detectable when viewing the image.

The processing speed may be further increased by dividing the image into four parts, or more generally into 2n parts, where n is any whole number. When determining the value of n, the cost related to the duplication of the processing chains should be taken into account, as the architecture of the readout circuit must provide 2n processing chains. The value of n can be determined by compromising between the cost related to duplicating the processing chains and the increase in the total image processing speed.

In these embodiments of the present invention, it is therefore possible to process captured images 2n times faster, by implementing 2n processing chains adapted to process separate parts of the captured image.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for reading a captured image comprising a set of pixels, the captured image comprising at least first and second parts of the image, and a border area of the image, the method comprising the steps of:
    obtaining converted pixels by applying a digital-to-analog conversion to the pixels of the captured image;
    storing in a buffer the converted pixels of the border area of the image;
    supplying the converted pixels of the first part of the image to a first processing chain, the converted pixels of the first part of the image not being supplied to a second processing chain;
    supplying the converted pixels of the second part of the image to the second processing chain, the converted pixels of the second part of the image not being supplied to the first processing chain;
    supplying the converted pixels of the border area of the image from the buffer to both the first and second processing chains so that the first and second processing chains receive some of the same converted pixels of the image;
    obtaining a first set of processed pixels by using the first processing chain to apply image processing to the converted pixels of the first part of the image and the converted pixels of the border area of the image;
    obtaining a second set of processed pixels by using the second processing chain to apply image processing to the converted pixels of the second part of the image and the converted pixels of the border area of the image; and
    providing a processed image for display by combining the first and second sets of processed pixels,
    wherein the border area of the image is a separate part of the image positioned in between the first and second parts of the image, such that the first part of the image does not include any of the border area and the second part of the image does not include any of the border area.

2. The method according to claim 1,
    wherein the buffer comprises first and second buffers,
    the border area is composed of first and second areas, and
    in the storing step, the first area is stored in the first buffer and the second area is stored in the second buffer.

3. The method according to claim 2,
    wherein the captured image comprises a plurality of columns of pixels,
    the step of obtaining converted pixels comprises:
        simultaneously reading from respective static random access memories, a column of pixels located in the first part of the image, at a furthest side from the border area, and a column of pixels located in the second part of the image, at a furthest side from the border area;
        simultaneously reading from respective static random access memories a column adjacent to a last column of pixels stored from the first part of the image and a column adjacent to a last column of pixels stored from the second part; and
        repeating the previous step until a column of pixels in the first part of the image adjacent to the border area and a column of pixels in the second part of the image adjacent to the border area are reached, and
    the storing step comprises:
        simultaneously reading from respective static random access memories and storing in respective first and second buffers a column of pixels located at a first side of the border area adjacent to the first part of the image and a column of pixels located at a second side of the border area adjacent to the second part of the image;
        simultaneously reading from respective SRAMS and storing in respective first and second buffers the columns respectively adjacent to the last columns of pixels stored from the border area by respectively reading from the border area in two opposite directions starting from the first and second sides; and
        repeating the previous step until the border area has been completely read.

4. The method according to claim 1,
    wherein the image processing comprises applying at least one filter,
    the size of the border area is determined as a function of the filter, and
    the border area has a width of 2b columns of pixels, with b being any whole number.

5. The method according to claim 1, wherein the captured image comprises additional parts of the image and there is a border area between each pair of consecutive parts of the image.

6. The method according to claim 1, wherein the captured image comprises at least a third part of the image and another border area positioned between the second and third parts of the image.

7. The method according to claim 6, further comprising the step of obtaining a third set of processed pixels by applying image processing to the converted pixels of the third part of the image and the converted pixels of the other border area.

8. The method according to claim 1, further comprising the step of storing in a memory the converted pixels of the first and second parts of the image, the converted pixels of the border area of the image not being stored in the memory.

9. The method according to claim 1, wherein the step of providing the processed image comprises, based on redundancy in the processed pixels output by the first and second processing chains, the sub-steps of:
    using the processed pixels of the second set of processed pixels output from the second processing chain that correspond to a first portion of the border area of the image while ignoring the processed pixels of the first set of processed pixels output from the first processing chain that correspond to the first portion of the border area of the image; and
    using the processed pixels of the first set of processed pixels output from the first processing chain that correspond to a second portion of the border area of the image while ignoring the processed pixels of the second set of processed pixels output from the second processing chain that correspond to the second portion of the border area of the image.

10. The method according to claim 1,
    wherein the second processing chain is a duplicate of the first processing chain, and
    the first and second processing chains each include at least one of a descrambler unit and a resolution conversion unit.

11. The method according to claim 1,
    wherein the step of obtaining converted pixels comprises using a single digital-to-analog converter to convert all of the pixels of the captured image into the converted pixels of the first part, second part, and border area of the image, and the second processing chain is a duplicate of the first processing chain and is adapted to perform the same operations as the first processing chain.

12. A processing device for reading a captured image comprising a set of pixels, the captured image comprising at least first and second parts of the image, and a border area of the image, the processing device comprising:
  a conversion unit adapted to obtain converted pixels by applying a digital-to-analog conversion to the pixels in the captured image;
  a buffer adapted to store the converted pixels of the border area of the image;
  a first processing chain adapted to obtain a first set of processed pixels by applying image processing to the converted pixels of the first part of the image and to the converted pixels of the border area of the image, the converted pixels of the first part of the image being supplied to the first processing chain, while the converted pixels of the second part of the image are not supplied to the first processing chain;
  a second processing chain adapted to obtain a second set of processed pixels by applying image processing to the converted pixels of the second part of the image and the converted pixels of the border area of the image, the converted pixels of the second part of the image being supplied to the second processing chain, while the converted pixels of the first part of the image are not supplied to a second processing chain; and
  a combining unit adapted to provide a processed image for display by combining the first and second sets of processed pixels,
  wherein the border area of the image is a separate part of the image positioned in between the first and second parts of the image, such that the first part of the image does not include any of the border area and the second part of the image does not include any of the border area, and
  the converted pixels of the border area of the image are supplied from the buffer to both the first and second processing chains so that the first and second processing chains receive some of the same converted pixels of the image.

13. The processing device according to claim 12, wherein the buffer comprises first and second buffers, the border area is composed of first and second areas, and the first area is stored in the first buffer and the second area is stored in the second buffer.

14. The processing device according to claim 13, wherein the captured image comprises a plurality of columns of pixels stored in respective static random access memories, and
  the processing device further comprises a unit for reading from the respective static random access memories, the unit being adapted to read simultaneously a column of pixels located in the first part of the image at a furthest side from the border area, and a column of pixels located in the second part of the image at a furthest side from the border area; then simultaneously a column adjacent to a last column of pixels stored from a first part of the image and a column adjacent to a last column of pixels stored from the second part, in succession, until the column of pixels in the first part of the image adjacent to the border area and the column of pixels in the second part of the image adjacent to the border area are reached; and being adapted to read and store in first and second buffers simultaneously a column of pixels located at a first side of the border area adjacent to the first part of the image and a column of pixels located at a second side of the border area adjacent to the second part of the image; then simultaneously the columns of pixels respectively adjacent to the last columns of pixels stored from the border area by successively reading from the border area in two opposite directions until the border area has been completely read.

15. The processing device according to claim 13, wherein the captured image comprises at least a third part of the image and another border area positioned between the second and third parts of the image, and
  the processing device further comprises a third processing chain adapted to obtain a third set of processed pixels by applying image processing to the converted pixels of the third part of the image and the converted pixels of the other border area.

16. An image processing system comprising:
  the processing device according to claim 12; and
  a display for viewing the images processed by the processing device.

17. A mobile telephone comprising:
  an image sensor; and
  the processing device according to claim 12.

18. A digital camera comprising:
  an image sensor; and
  the processing device according to claim 12.

19. A non-transitory computer-readable storage medium encoded with a computer program for reading a captured image comprising a set of pixels, the captured image comprising at least first and second parts of the image, and a border area of the image, the computer program containing instructions for performing the steps of:
  obtaining pixels converted by applying a digital-to-analog conversion to the pixels in the captured image;
  storing in a buffer the converted pixels of the border area of the image;
  supplying the converted pixels of the first part of the image to a first processing chain, the converted pixels of the first part of the image not being supplied to a second processing chain;
  supplying the converted pixels of the second part of the image to the second processing chain, the converted pixels of the second part of the image not being supplied to the first processing chain;
  supplying the converted pixels of the border area of the image from the buffer to both the first and second processing chains so that the first and second processing chains receive some of the same converted pixels of the image;
  obtaining a first set of pixels processed by using the first processing chain to apply image processing to the converted pixels of the first part of the image and the converted pixels of the border area of the image;
  obtaining a second set of pixels processed by using the second processing chain to apply image processing to the converted pixels of the second part of the image and the converted pixels of the border area of the image; and
  providing a processed image for display by combining the first and second sets of processed pixels,
  wherein the border area of the image is a separate part of the image positioned in between the first and second parts of the image, such that the first part of the image does not include any of the border area and the second part of the image does not include any of the border area.

20. The non-transitory computer-readable storage medium according to claim 19,
  wherein the buffer comprises first and second buffers, the border area is composed of first and second areas, and in the storing step, the first area is stored in the first buffer and the second area is stored in the second buffer.

21. The non-transitory computer-readable storage medium according to claim 19,
wherein the captured image comprises a plurality of columns of pixels,
the step of obtaining converted pixels comprises:
simultaneously reading from respective static random access memories, a column of pixels located in the first part of the image, at a furthest side from the border area, and a column of pixels located in the second part of the image, at a furthest side from the border area;
simultaneously reading from respective static random access memories a column adjacent to a last column of pixels stored from the first part of the image and a column adjacent to a last column of pixels stored from the second part; and
repeating the previous step until a column of pixels in the first part of the image adjacent to the border area and a column of pixels in the second part of the image adjacent to the border area are reached, and
the storing step comprises:
simultaneously reading from respective static random access memories and storing in respective first and second buffers a column of pixels located at a first side of the border area adjacent to the first part of the image and a column of pixels located at a second side of the border area adjacent to the second part of the image;
simultaneously reading from respective SRAMS and storing in respective first and second buffers the columns respectively adjacent to the last columns of pixels stored from the border area by respectively reading from the border area in two opposite directions starting from the first and second sides; and
repeating the previous step until the border area has been completely read.

22. The non-transitory computer-readable storage medium according to claim 19,
wherein the image processing comprises applying at least one filter,
the size of the border area is determined as a function of the filter, and
the border area has a width of 2b columns of pixels, with b being any whole number.

* * * * *

UNITED STATES PATENT AND TRADEMARK OFFICE
CERTIFICATE OF CORRECTION

PATENT NO.      : 8,208,036 B2
APPLICATION NO. : 12/560620
DATED           : June 26, 2012
INVENTOR(S)     : Pascal Mellot et al.

It is certified that error appears in the above-identified patent and that said Letters Patent is hereby corrected as shown below:

On the Title page, Item (73), under "Assignees", change "STMciroelectronics R & D Limited" to --STMicroelectronics R&D Limited--.

Signed and Sealed this
Fourth Day of December, 2012

David J. Kappos
*Director of the United States Patent and Trademark Office*